(12) United States Patent
Chao

(10) Patent No.: US 7,080,847 B2
(45) Date of Patent: Jul. 25, 2006

(54) PORTABLE BICYCLE

(76) Inventor: Hung-Chang Chao, 6F, No. 21, Alley 29, Lane 372, Section 5, Chung-Shiao East Road, Taipei (TW) 110

( * ) Notice: Subject to any disclaimer, the term of this patent is extended or adjusted under 35 U.S.C. 154(b) by 0 days.

(21) Appl. No.: 10/853,136

(22) Filed: May 26, 2004

(65) Prior Publication Data

US 2004/0245743 A1 Dec. 9, 2004

(30) Foreign Application Priority Data

Jun. 4, 2003 (CN) .............................. 03 2 64804

(51) Int. Cl.
*B62M 1/16* (2006.01)
(52) U.S. Cl. .................... 280/278; 280/287; 280/281.1
(58) Field of Classification Search ............... 280/278, 280/287, 281.1
See application file for complete search history.

(56) References Cited

U.S. PATENT DOCUMENTS

| | | | | |
|---|---|---|---|---|
| 617,536 A * | 1/1899 | Baldwin | ................... | 280/281.1 |
| 1,474,531 A * | 11/1923 | Kirschbaum | ................ | 280/278 |
| 2,993,709 A * | 7/1961 | Wick | .......................... | 280/287 |
| 3,215,459 A * | 11/1965 | Baldwin | ........................ | 403/13 |
| 3,658,354 A * | 4/1972 | Read | .......................... | 280/7.15 |
| 3,876,231 A * | 4/1975 | Geisel | ......................... | 280/278 |
| 4,973,074 A * | 11/1990 | Robinson | .................... | 280/658 |
| 5,337,609 A * | 8/1994 | Hsu | ........................... | 74/551.3 |
| 5,398,955 A * | 3/1995 | Yeh | ............................ | 280/287 |
| 5,607,171 A * | 3/1997 | Labranche | ............... | 280/288.1 |
| 6,364,335 B1 * | 4/2002 | Mombelli | ................... | 280/287 |
| 6,712,375 B1 * | 3/2004 | Chao | .......................... | 280/287 |
| 6,854,752 B1 * | 2/2005 | Chao | .......................... | 280/278 |

* cited by examiner

*Primary Examiner*—Lesley D. Morris
*Assistant Examiner*—Marlon Arce-Diaz
(74) *Attorney, Agent, or Firm*—Birch, Stewart, Kolasch & Birch, LLP

(57) ABSTRACT

A portable bicycle comprises a front bar having a front end coupled to a head tube, a rear frame section including a lower seat tube extended upwardly from a bottom bracket, a upper seat tube spaced and aligned with the lower seat tube, and a hollow rear bar for slidably receiving the front bar, the rear bar being intersected the upper and lower seat tubes, and a fastening mechanism for securing the front bar to the rear bar. Detaching a seat post and a saddle, unfastening the fastening mechanism, fully projecting the front bar from a rear opening of the rear bar, and fastening the fastening mechanism will shorten the distance between front and rear wheels to a minimum and facilitate the bicycle to store or carry in a much reduced size.

6 Claims, 11 Drawing Sheets

PORTABLE BICYCLE

BACKGROUND OF THE INVENTION

1. Field of the Invention

The present invention relates to stretching bicycles and more particularly to a portable bicycle having a compact size after disassembly so as to save storage space while being carried.

2. Description of the Prior Art

Conventionally, a stretching bicycle has a separable crossbar consisting of a front bar and a rear bar releasably secured to the front bar by a fastening mechanism. Thus, the maximum length reduction of the bicycle is defined by the front and rear bars, the head tube, and the seat tube.

The present inventor had filed an application in the U.S. patent application Ser. No. 10/346,128 on Jan. 17, 2003 (hereinafter prior art) which is incorporated herein by reference. Prior art discloses a stretching bicycle characterized as follows. Two parallel main seat tube and auxiliary seat tube are extended upwardly from the bottom bracket in a slightly inclined direction. Also, the main seat tube is laterally displaced a predetermined distance from a lengthwise direction of the bicycle (i.e., not aligned with the crossbar). A seat stay is extended rearwardly from both the main seat tube and the auxiliary seat tube to the rear wheel. A seat post is slidably inserted into the main seat tube. A laterally extended bar is interconnected to the seat post and a saddle such that the saddle is adapted to align with the lengthwise direction of the bicycle again (i.e., aligned with the crossbar). The lower portion of the auxiliary seat tube is coupled to a reinforcement tube and a top thereof is coupled to a crossbar having both ends open. Two T-shaped gaps are formed adjacent a front end and a rear end of the crossbar respectively for providing flexibility thereto. A sliding tube has a front end fixedly coupled to a head tube and a rear end adapted to insert through the crossbar. Also, a lengthwise first groove and a lengthwise mated second groove are formed on the crossbar and the sliding tube respectively for facilitating a correct coupling of the crossbar and the sliding tube and preventing both from turning relative to each other. Two quick releases are adapted to clamp around the gaps for securing the sliding tube to the crossbar. Prior art has advantages of being structurally strong and making a maximum length reduction of the bicycle achievable. However, prior art still has the disadvantage of having a relatively heavy frame due to the provision of the main seat tube, the auxiliary seat tube, and the laterally extended bar. Moreover, the saddle and the seat post are not aligned vertically. Hence, the weight of the driver may not totally transmit to other components of the frame via the saddle, the laterally extended bar, and seat post. In other words, the joining portion of the laterally extended bar and the seat post bears a great portion of the weight of the driver. This in turn has the potential of breaking the joining portion while driving. This is dangerous. Thus, it is desirable to provide a portable bicycle having a compact size after disassembly in order to overcome the above drawbacks of the prior art.

SUMMARY OF THE INVENTION

It is an object of the present invention to provide a portable bicycle which is adapted to decrease its length to a minimum by projecting a front bar from the rear opening of a rear bar to a maximum extent.

It is another object of the present invention to provide a portable bicycle which is adapted to decrease its length without the provision of a seat tube composed of a plurality of components such that the present invention has the advantages of eliminating the provision of an offset seat tube, being lightweight, being highly portable, being easy in manufacture, and eliminating the need of aligning the center line of a saddle again.

For achieving the above objects, there is provided a portable bicycle comprising a front frame section including a head tube, a fork, a handlebar, a stem interconnected to the handlebar and the head tube, a front wheel, and a front bar having a front end coupled to the head tube; a rear frame section including a bottom bracket, a pair of pedals coupled to the bottom bracket, a sprocket wheel coupled to the bottom bracket, a rear wheel, a chain stay extended rearward from the bottom bracket to an axle of the rear wheel, a seat stay having, a rear end coupled to the axle of the rear wheel, a lower seat tube extended upwardly from the bottom bracket, an upper seat tube aligned with the lower seat tube, a seat post slidably inserted into the upper and lower seat tubes, a saddle formed on a top of the seat post, and a hollow rear bar for slidably receiving the front bar, the rear bar being intersected by the upper and lower seat tubes and having a top aperture and a bottom aperture with the upper and lower seat tubes connected thereto; and at least one fastening mechanism for securing the front bar to the rear bar; whereby detaching both the seat post and the saddle, unfastening the fastening mechanism, and sliding the front bar with respect to the rear bar to a limit will collapse the bicycle to a compact size. In response to projecting the front bar from the rear opening of the rear bar to dispose above the rear wheel, the bicycle has a minimum length and is able to save storage space while being stored or carried.

BRIEF DESCRIPTION OF THE DRAWINGS

The drawings disclose an illustrative embodiment of the present invention which serves to exemplify the various advantages and objects hereof, and are as follow.

DETAILED DESCRIPTION OF THE PREFERRED EMBODIMENTS

Figure 1:
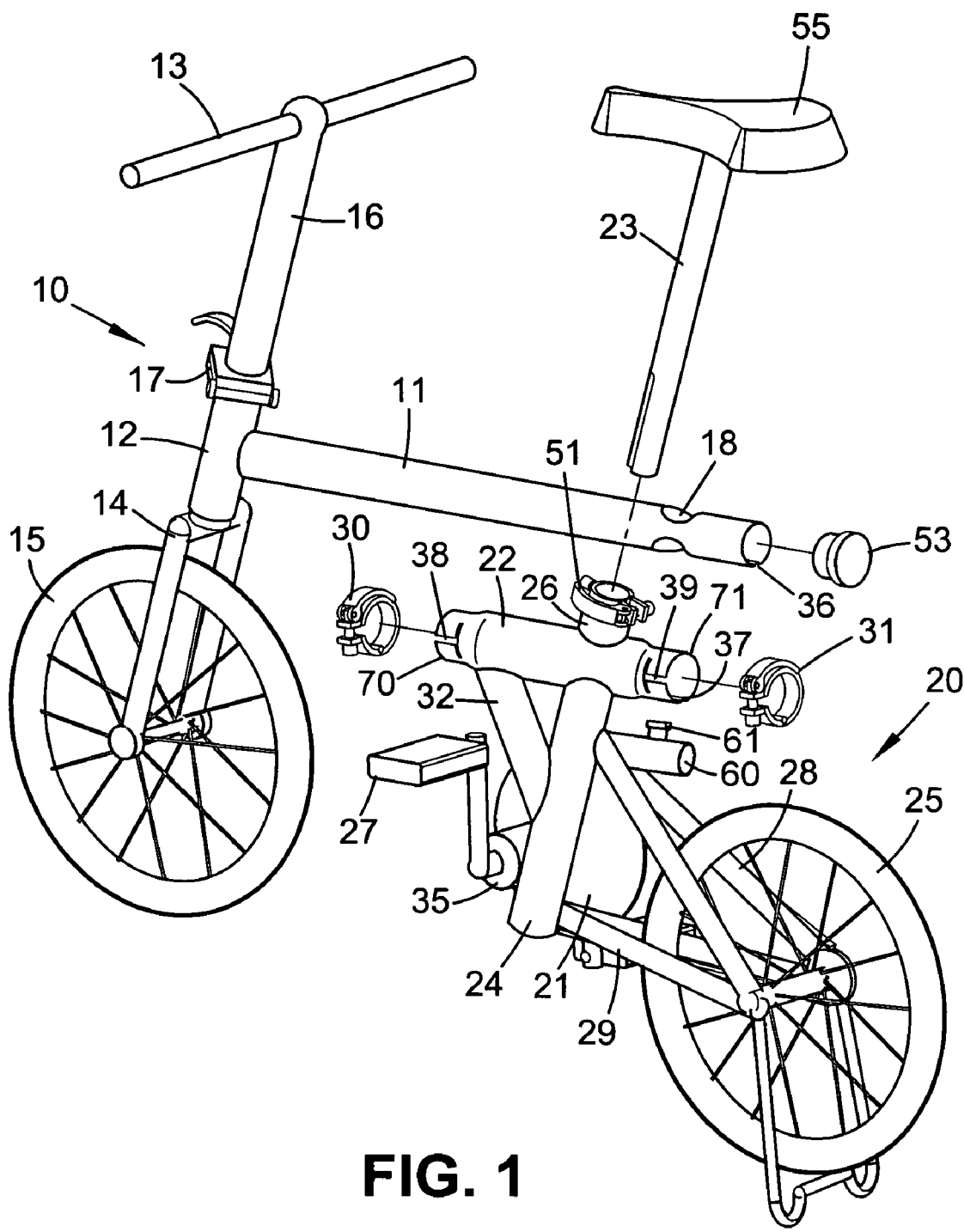
FIG. 1 is an exploded perspective view of a first preferred embodiment of portable bicycle according to the invention.
Figure 2:
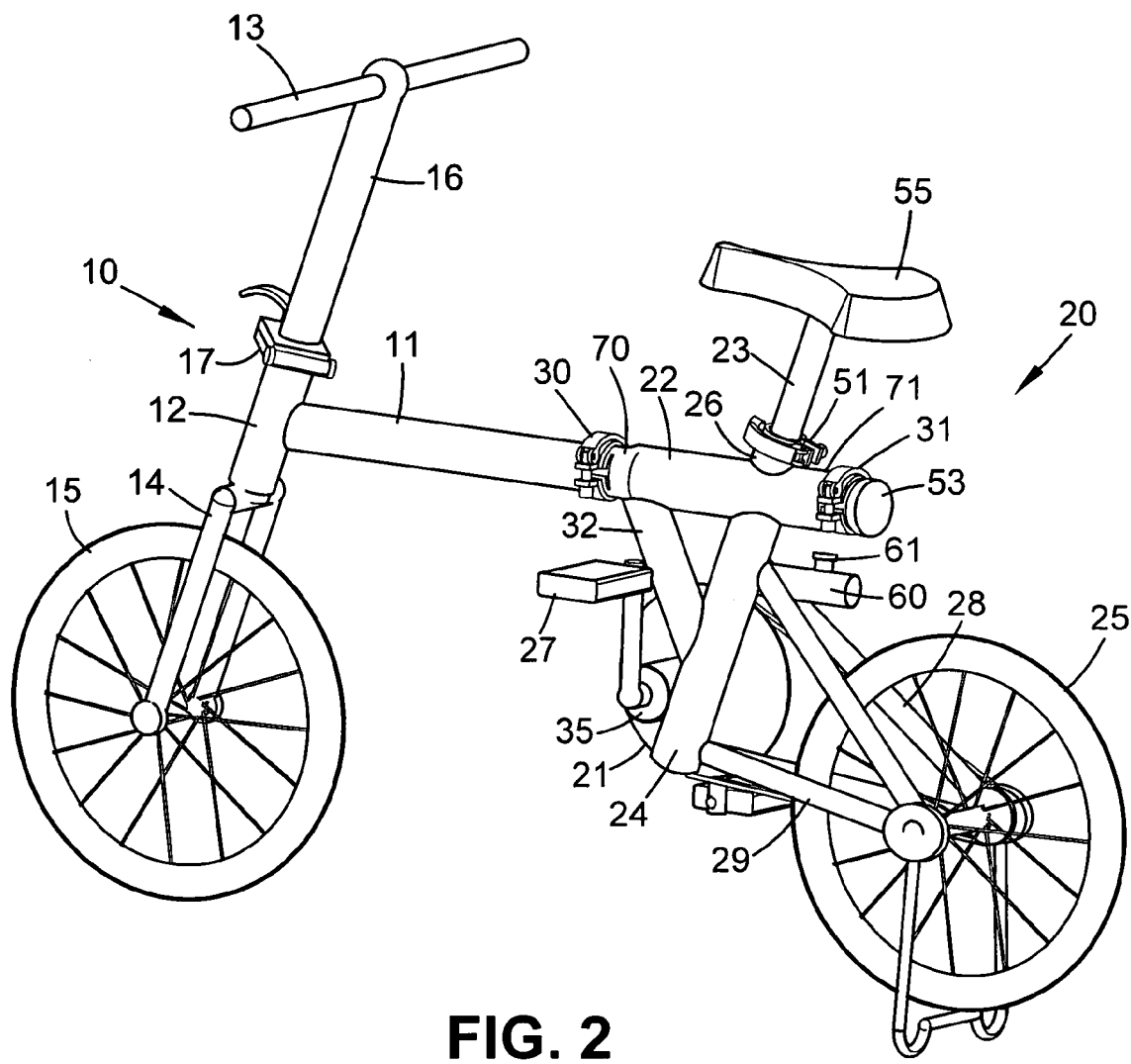
FIG. 2 is a perspective view of the assembled bicycle of FIG. 1.
Figure 3:
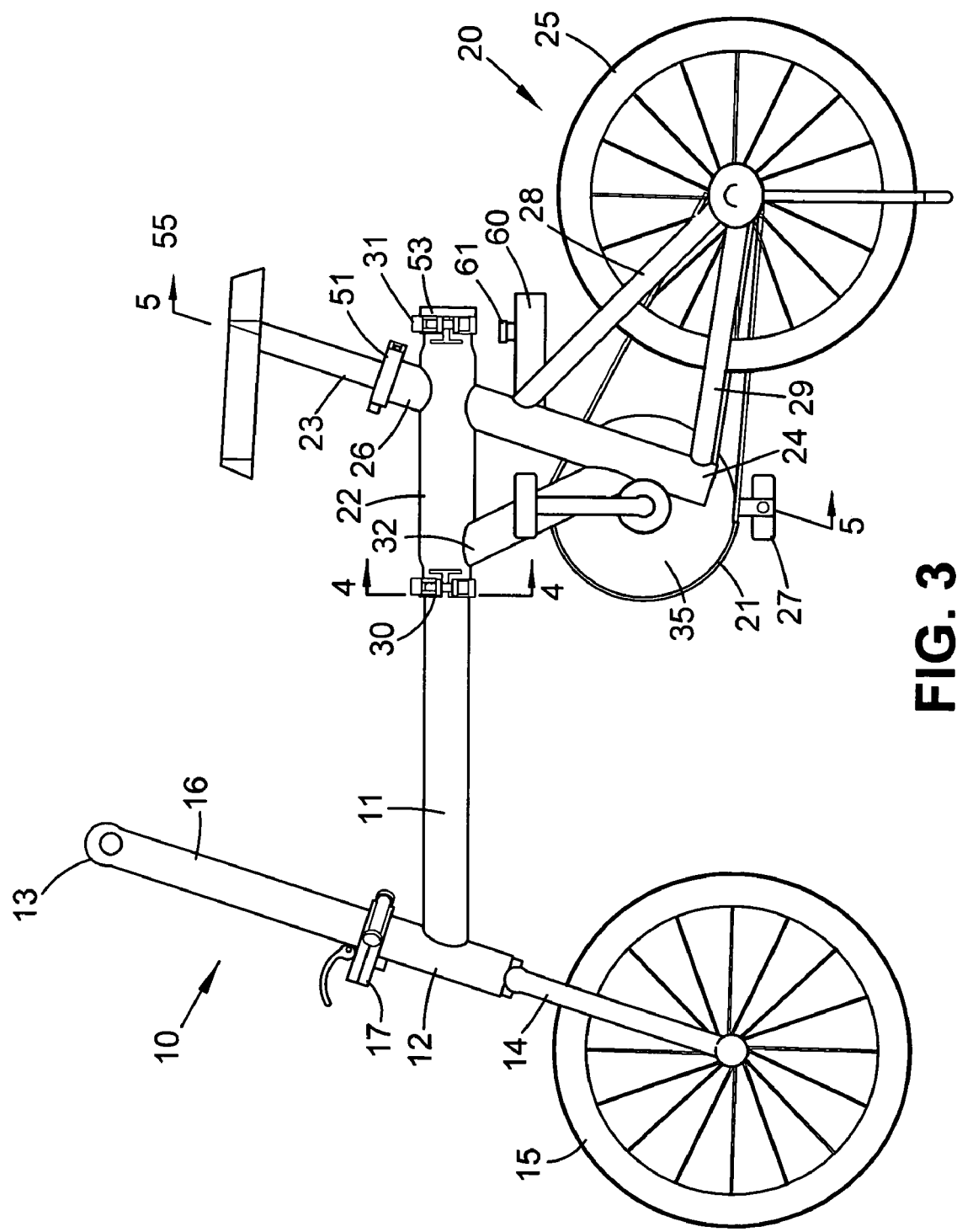
FIG. 3 is a side plan view of the bicycle of FIG. 2.

Referring to FIGS. 1 to 8, there is shown a portable bicycle constructed in accordance with a first preferred embodiment of the invention. The bicycle comprises a front frame section 10 and a rear frame section 20 releasably coupled to the front frame section 10 by a fastening mechanism in which a size of the bicycle is also adapted to reduce to a minimum after disassembly as detailed later. The front frame section 10 comprises a head tube 12, a fork 14, a handlebar 13, a stem 16 interconnected to the handlebar 13 and the head tube 12, a front wheel 15 releasably coupled to the fork 14 by means of a well known quick release, two bearings (not shown) provided between the fork 14 and the head tube 12 so that the handlebar 13 is adapted to turn a predetermined angle, and a hinge 17 provided at the joining portion of the head tube 12 and the stem 16 so that the stem 16 is adapted to fold downwardly from the hinge 17 (see FIG. 7).

The rear frame section 20 comprises a bottom bracket 35, a pair of pedals 27 coupled to the bottom bracket 35, a sprocket wheel 21 coupled to the bottom bracket 35, a rear wheel 25, and a chain stay 29 extended rearwardly from the bottom bracket 35 to an axle of the rear wheel 25.

Figure 5:
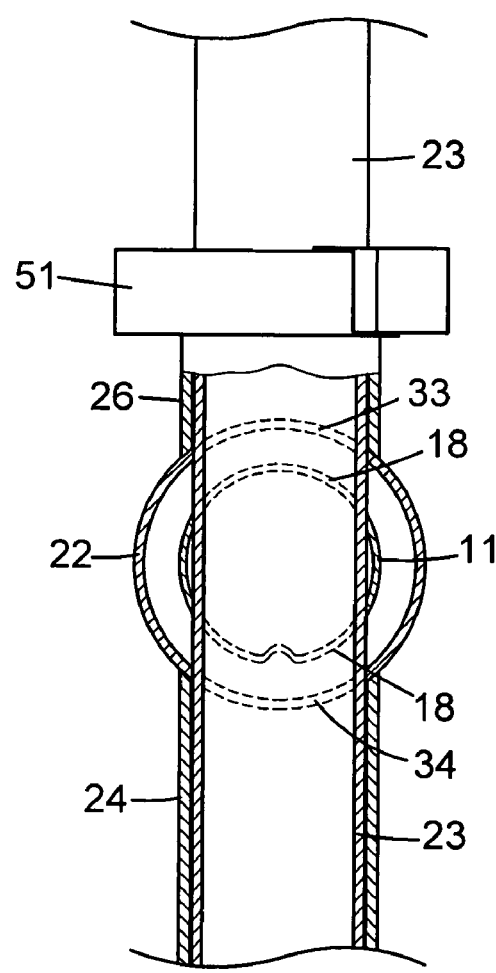

As shown in FIG. 5, the rear frame section 20 further comprises a lower seat tube 24 extended upwardly from the bottom bracket 35, an upper seat tube 26 spaced and aligned with the lower seat tube 24, a seat stay 28 having a rear end coupled to the axle of the rear wheel 25, and a seat post 23 slidably inserted into the upper seat tube 26 and the lower seat tube 24 as detailed later, the seat post 23 having a top saddle 55.

Figure 4:
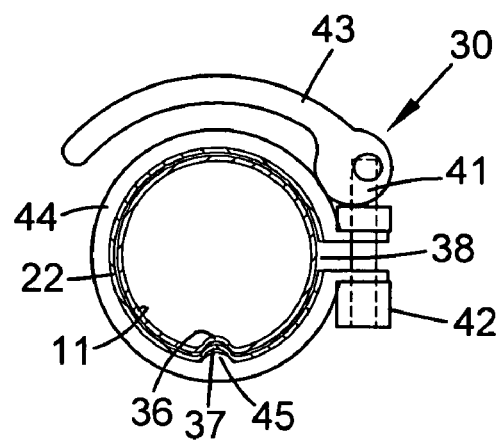
FIGS. 4 and 5 are cross-sectional views taken along line 4—4 and line 5—5 of FIG. 3 respectively.

A crossbar comprises a horizontal, hollow front bar 11 including a front end fixedly coupled to the head tube 12, one or more substantially vertical channels 18 (one is shown), and a lengthwise first groove 36 terminated at a rear end (see FIG. 4). A cap 53 is adapted to matingly couple to the rear end of the front bar 11 so that articles such as umbrella, air pump, etc. stored in the front bar 11 can be prevented from leaving accidentally.

The crossbar further comprises a horizontal, hollow rear bar 22 including a top aperture 33 and a bottom aperture 34 with the seat tube passed therebetween. Front opening 70 and rear opening 71 of the rear bar 22 are reduced in diameter. Also, an outer diameter of the front bar 11 is about the same as an inner diameter of either opening 70 or 71 so that the front bar 11 is adapted to slide through the openings 70 and 71. A lengthwise second groove 37 is formed on the rear bar 22. The second groove 37 is matingly coupled to an outer surface of the first groove 36 for facilitating a correct coupling of the rear bar 22 and the front bar 11 and preventing both from turning relative to each other. Two T-shaped gaps 38 and 39 are formed adjacent the front opening 70 and the rear opening 71 respectively so as to provide flexibility thereto.

The rear bar 22 and the inserted front bar 11 are secured together by fastening first and second fastening members 30 and 31 at the front T-shaped gap 38 and the rear T-shaped gap 39 by flexibly deforming the T-shaped gaps 38 and 39 respectively. In detail, as seen in FIG. 4, a bolt 41 of the first quick release 30 is inserted through the holes of two flat, opposite ends (i.e., lugs) of a C-ring 44 to be threadedly coupled to a nut 42. A ridge 45 is formed on an inner surface of the first fastening member 30. The ridge 45 is adapted to matingly engage with both the first and second grooves 36 and 37 for positioning. A driver may turn the arcuate lever 43 of the first fastening member 30 counterclockwise to cause its cam end to exert force on the ends of the C-ring 44 for pulling toward each other. The rear bar 22 thus exerts force to clamp around the front bar 11 for fastening. To the contrary, a reverse operation of the lever 43 can unfasten the front bar 11 and the rear bar 22. The second fastening member 31 will not be described in detail below since it is a mirror image of the first fastening member 30.

Moreover, an oblique down tube 32 as a reinforcement is interconnected the rear bar 22 and the lower seat tube 24. The rear bar 22, the lower seat tube 24, and the down tube 32 form a triangle. Likewise, the seat stay 28, the chain stay 29, and the lower seat tube 24 form another triangle. As a result, the frame strength of the bicycle is increased greatly.

A driver may insert the seat post 23 through the upper seat tube 26 and the channel 18 into the lower seat tube 24 until a desired height of the saddle 55 is reached. Next, the driver may manipulate a third fastening member 51 at a top opening of the upper seat tube 26 in a manner similar to the operation of either first or second fastening member 30 or 31 for securing the seat post 23 to the upper seat tube 26 (i.e., height adjustment).

Figure 6:
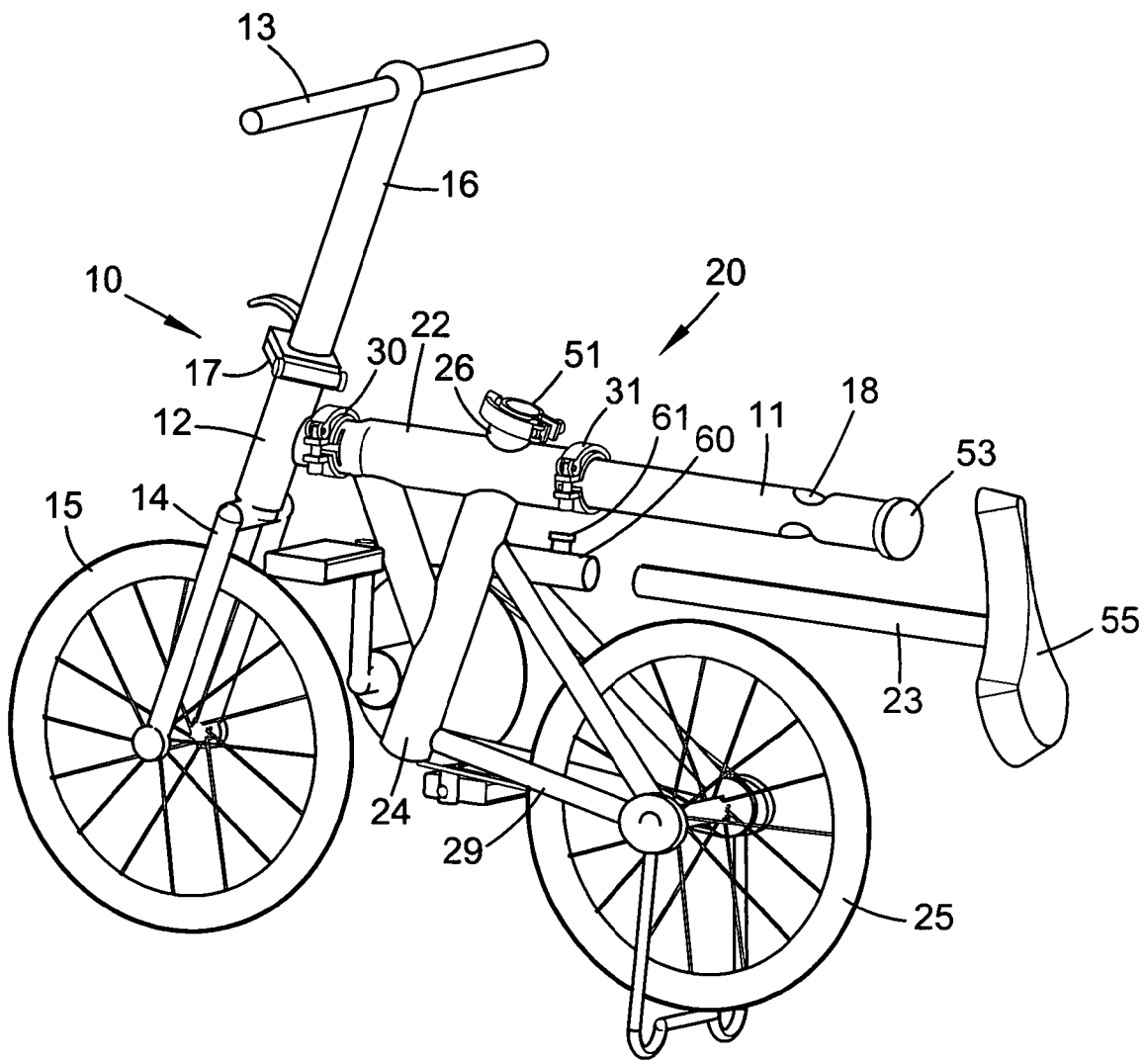
FIG. 6 is a perspective view of the bicycle of FIG. 2 with the length thereof being adjusted to a minimum and the seat post removed to be inserted into the horizontal tube.
Figure 7:
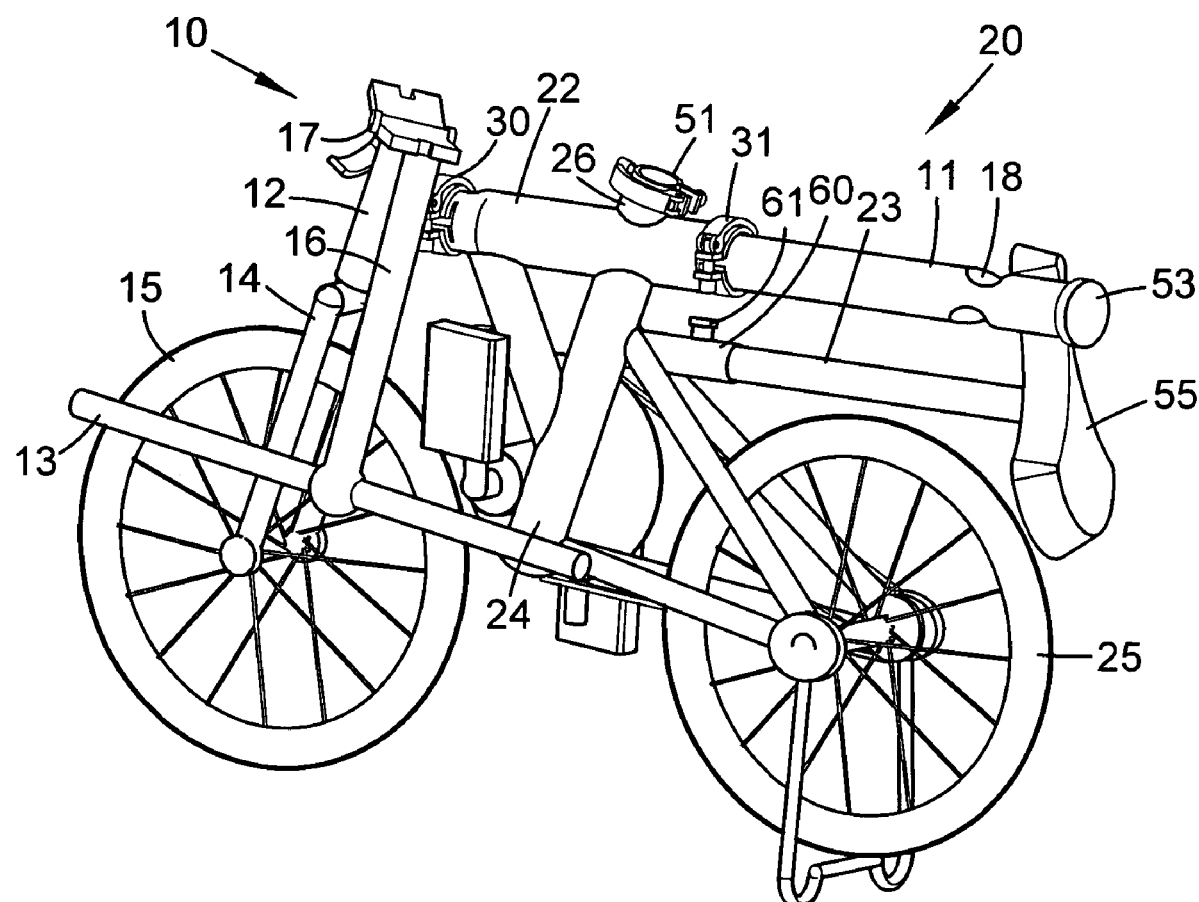
FIG. 7 is a view similar to FIG. 6, where the seat post is inserted into the horizontal tube and the stem is folded down.
Figure 8:
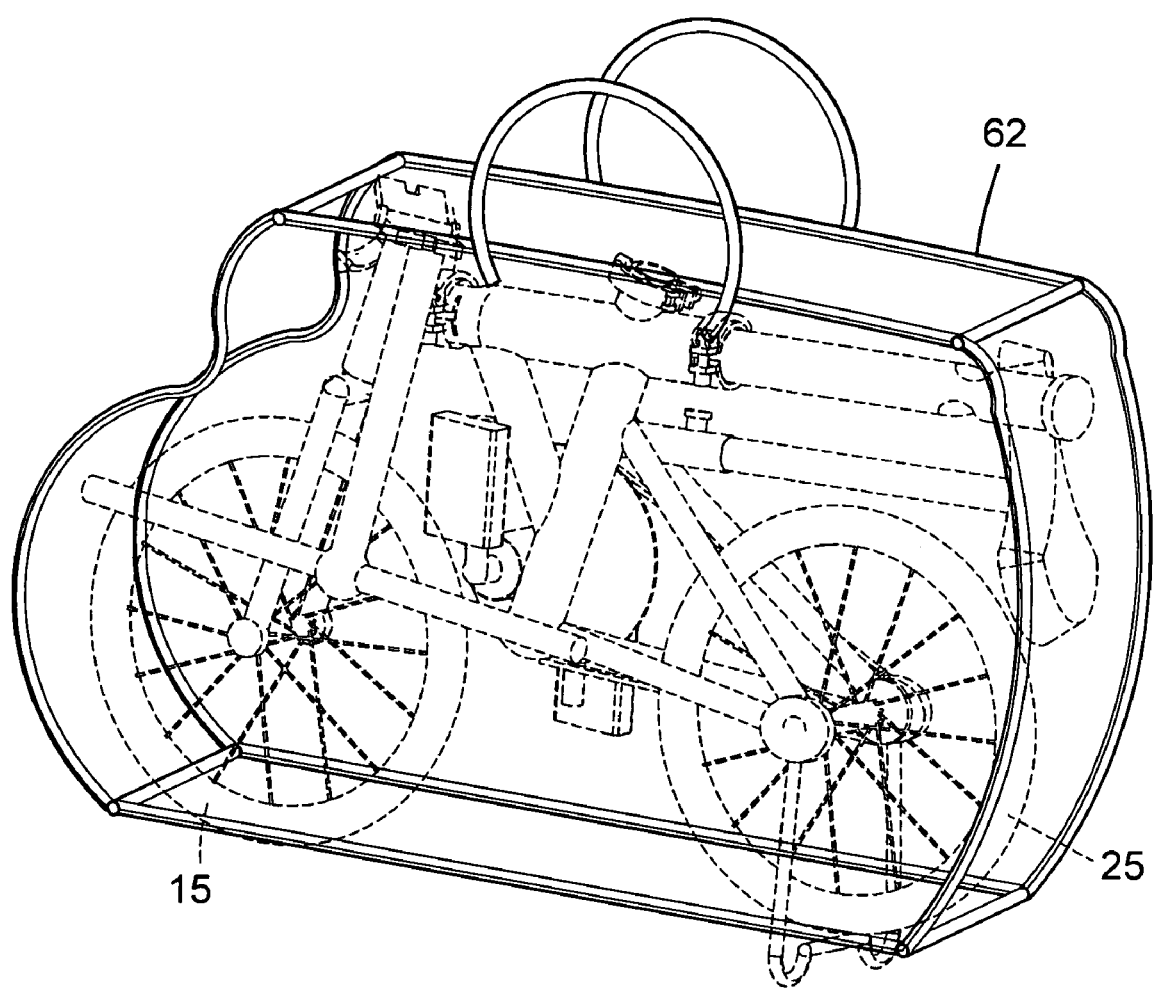
FIG. 8 is a perspective view of the bicycle of FIG. 7 stored in a bag for storage.
Figure 9:
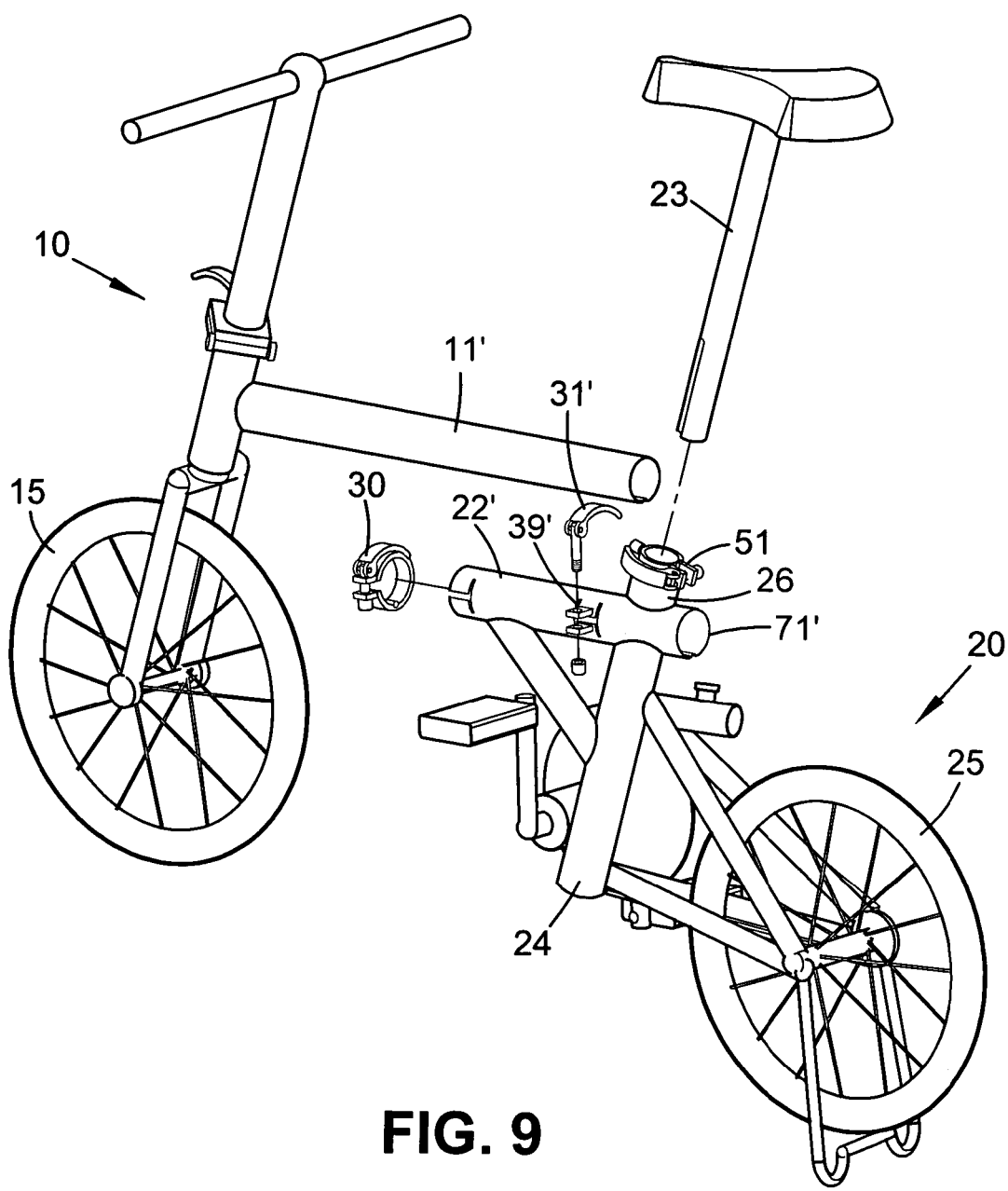
FIG. 9 is an exploded perspective view of a second preferred embodiment of portable bicycle according to the invention.

As shown in FIGS. 6 to 8, for collapsing the bicycle the driver may unfasten the third fastening member 51 prior to detaching both the seat post 23 and the saddle 55. Next, unfasten both the first and second fastening members 30 and 31 prior to sliding the front bar 11 with respect to the rear bar 22 until a minimum length of the bicycle (i.e., a minimum distance from the front wheel 15 to the rear wheel 25) is obtained so as to be compact. Next, fasten the first and second fastening members 30 and 31 again. The detached seat post 23 is adapted to snugly insert into a horizontal tube 60 extended rearwardly from the lower seat tube 24. Optionally, the driver may rotate the saddle 55 to an angle so as not to interfere with the front bar 11. Next, the driver may drive a bolt 61 into the horizontal tube 60 for fastening the seat post 23 in the horizontal tube 60. Finally, fold the stem 16 downwardly at the hinge 17 (see FIG. 7). The bicycle having the reduced size is thus adapted to store, for example, in a bag 62 for carrying or the trunk of a car prior to going for an outing (see FIG. 8). Preferably, the bag 62 has a zipper in the bottom so that either the front wheel 15 or the rear wheel 25 may be exposed. Thus, the driver may pull the handle of the bag 62 forward with the wheel being rotated along a supporting surface.

Note that each of the fastening members 30, 31, and 51 is implemented as a commercially available ring fastener, quick release, or the like. In the embodiment shown in FIG. 5, the cross-section of the front bar 11 or the rear bar 22 is a circle, although it is appreciated by those skilled in the art that the cross-section of the front bar 11 or the rear bar 22 may be any of other shapes such as oval or rectangle without departing from the scope and spirit of the invention.

Referring to FIGS. 9 to 12, there is shown a portable bicycle constructed in accordance with a second preferred embodiment of the invention. The second preferred embodiment substantially has same structure as the first preferred embodiment. The differences between the first and the second preferred embodiments, i.e., the characteristics of the second preferred embodiment are detailed below. The length of the front bar 11' is shorter than that of the front bar 11 so that in a position adapted to ride the front bar 11' does not project from the rear opening 71' of the rear bar 22' (see FIG. 11). Instead, the rear end of the front bar 11' is stopped by the seat post 23 inserted into the upper seat tube 26 and the lower seat tube 24. Thus, the front bar 11' does not have any substantially vertical channels 18 such that the structural strength of the front bar 11' can be further increased.

Figure 10:
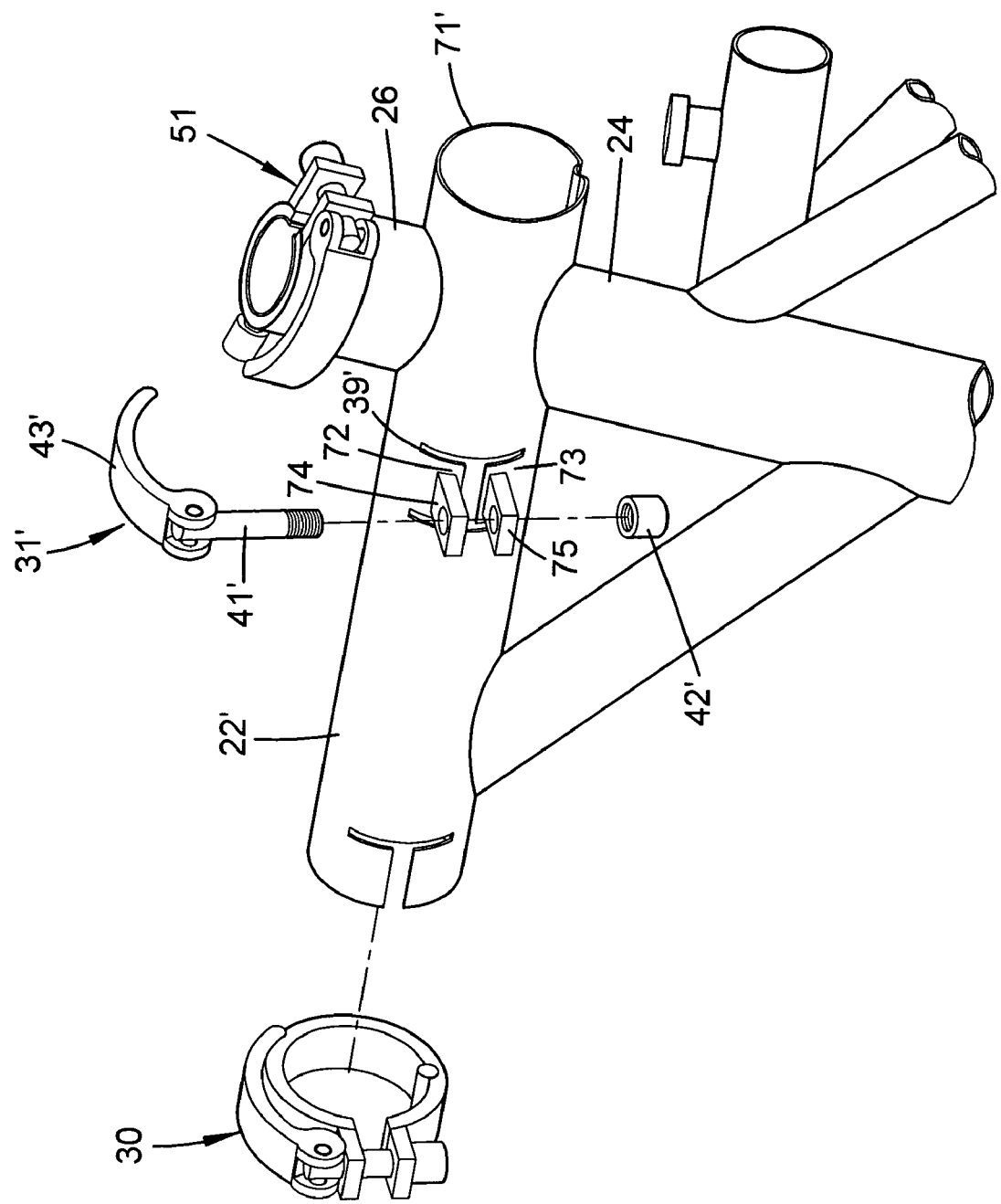
FIG. 10 is an enlarged view of the components around the seat tube and the rear bar of FIG. 9.
Figure 11:
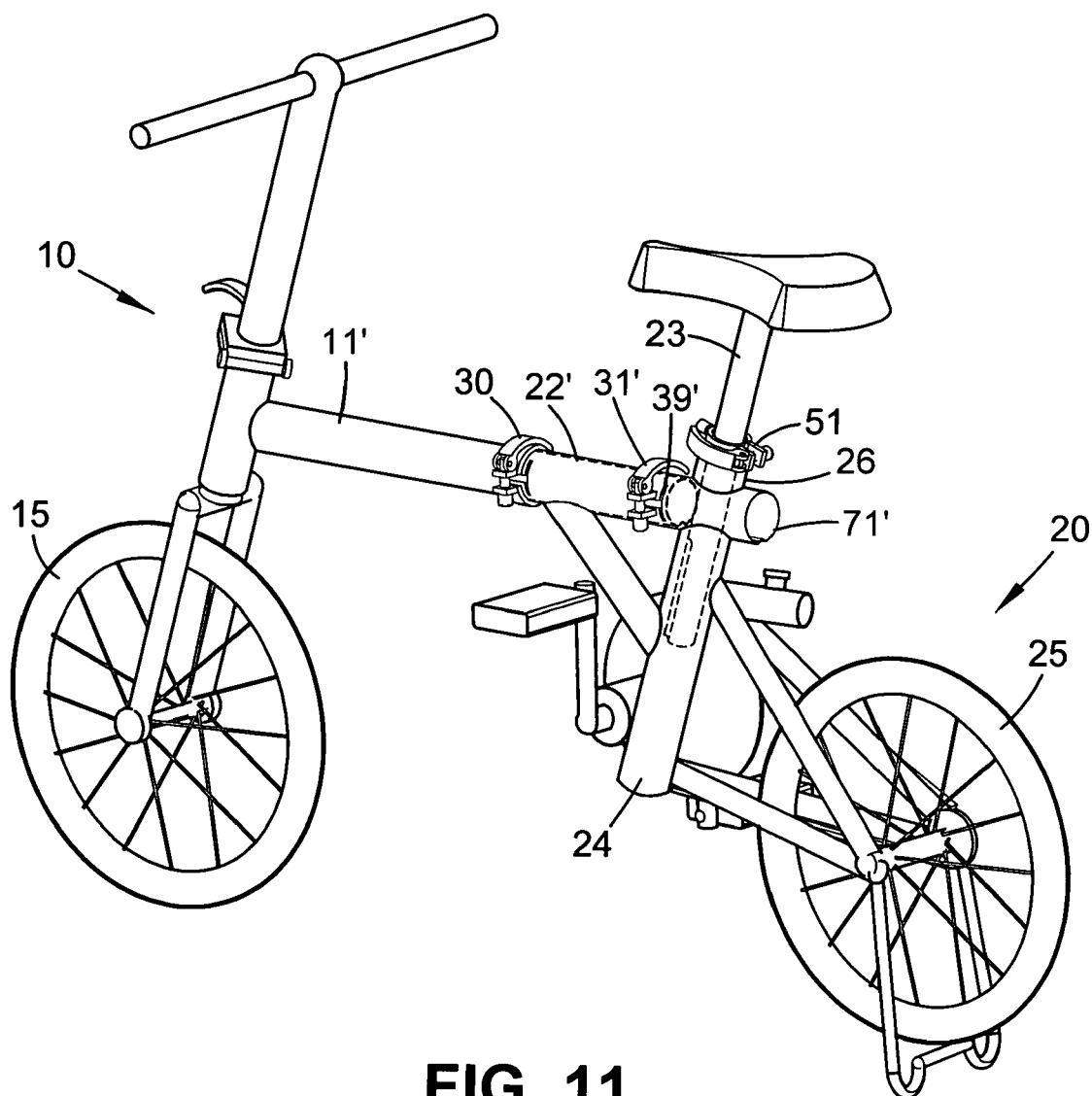
FIG. 11 is a perspective view of the assembled bicycle of FIG. 9.

The T-shaped gap 39 is eliminated by additionally providing a H-shaped gap 39' on an outer surface of the rear bar 22' proximate the joining portion of the lower seat tube 24 and the rear bar 22' so as to provide flexibility thereat (see FIG. 10). An upper flexible member 72 and a lower flexible member 73 are formed by the gap 39'. Upper and lower lugs 74 and 75 are extended outwardly from the upper and lower flexible members 72 and 73 respectively. A bolt 41' of the second fastening member 31' is adapted to insert through the upper and lower lugs 74 and 75 to be threadedly coupled to a nut 42'. An arcuate lever 43' has a cam end pivotally coupled to the head of the bolt 41'. A counterclockwise turning of the lever 43' causes the cam to exert force to pull the upper and lower lugs 74 and 75 toward each other by flexibly deforming the upper and lower flexible members 72 and 73 (i.e., fastening the front bar 11'). To the contrary, a clockwise turning of the lever 43' causes the cam to release the force to pull the upper and lower lugs 74 and 75 away from each other (i.e., unfastening the front bar 11').

Figure 12:
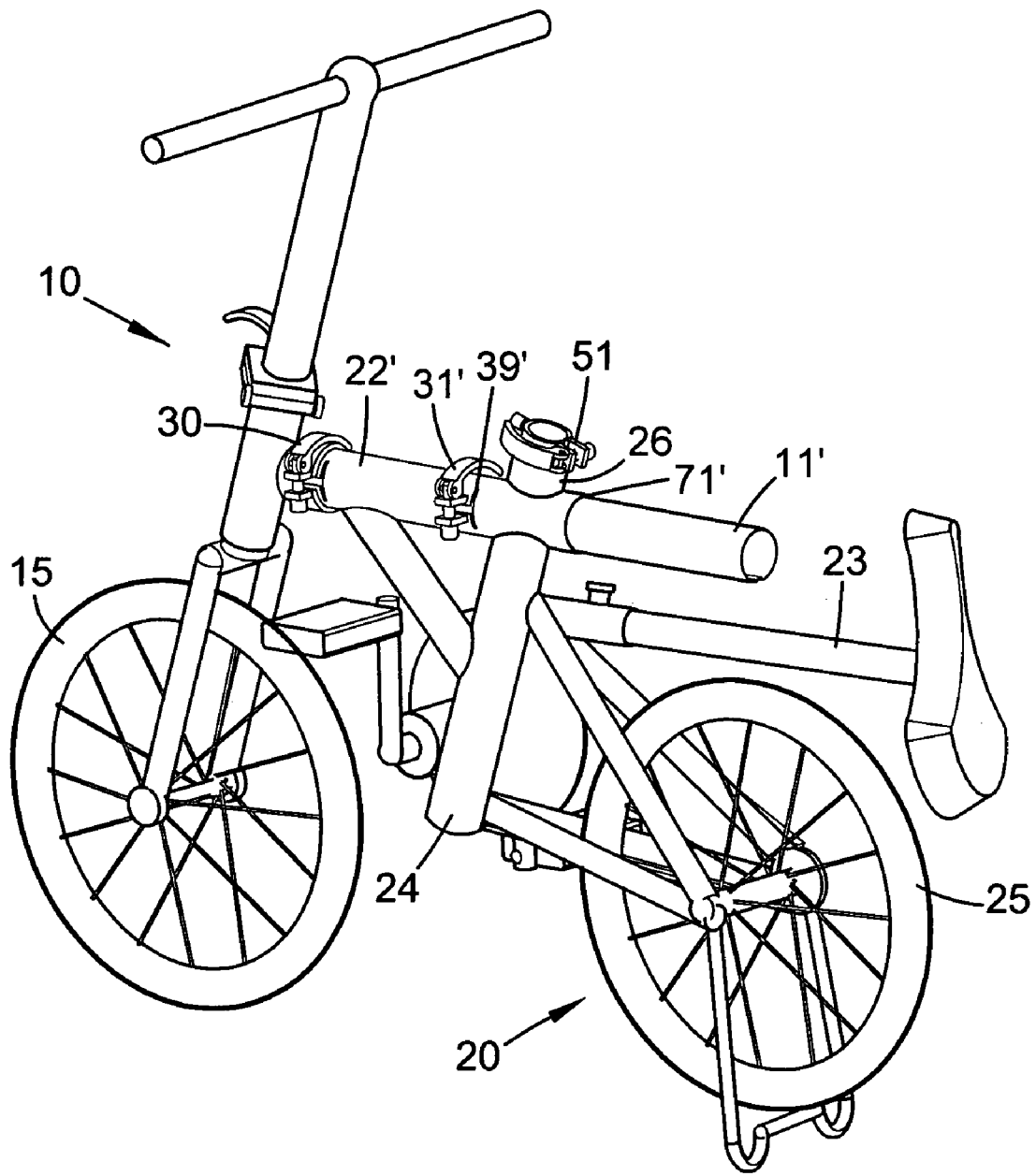
FIG. 12 is a perspective view of the bicycle of FIG. 11 with the length thereof being adjusted to a minimum and the seat post removed and inserted into the horizontal tube.

The collapsing operation of the bicycle of the second preferred embodiment will be described in detail below by referring to FIG. 12. A driver may unfasten the third fastening member 51 prior to detaching both the seat post 23 and the saddle 55. Next, unfasten both the first and second fastening members 30 and 31' prior to sliding the front bar 11' with respect to the rear bar 22' until a minimum length of the bicycle (i.e., a minimum distance from the front wheel 15 to the rear wheel 25) is obtained with the front bar 11' projected from the rear opening 71' of the rear bar 22' to dispose above the rear wheel 25. The bicycle having such reduced size is thus adapted for storing, parking, or carrying in the trunk of a car prior to going for an outing.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A portable bicycle comprising:
    a front frame section including a head tube, a fork, a handlebar, a stem interconnected to the handlebar and the head tube, a front wheel, and a front bar having a front end coupled to the head tube;
    a rear frame section including a bottom bracket, a pair of pedals coupled to the bottom bracket, a sprocket wheel coupled to the bottom bracket, a rear wheel, a chain stay extended rearward from the bottom bracket to an axle of the rear wheel, a seat stay having a rear end coupled to the axle of the rear wheel, a lower seat tube extended upwardly from the bottom bracket, an upper seat tube aligned with the lower seat tube, a seat post slidably inserted into the upper and lower seat tubes, a saddle formed on a top of the seat post, and a hollow rear bar for slidably receiving the front bar, the rear bar being intersected by the upper and lower seat tubes and having a top aperture and a bottom aperture with the upper and lower seat tubes connected thereat; and
    at least one fastening mechanism for securing the front bar to the rear bar;
    wherein the rear end of the front bar is stopped by the seat post inserted into the upper seat tube and the lower seat tube when the bicycle is in a position for riding, and the front bar is operative to project from the rear end of the rear bar after detaching the seat post;
    whereby detaching both the seat post and the saddle, unfastening the fastening mechanism, and sliding the front bar with respect to the rear bar to a limit will collapse the bicycle to a compact size.

2. The portable bicycle of claim 1, wherein the front bar comprises a lengthwise first groove and the rear bar comprises a lengthwise second groove matingly coupled to the first groove so that the rear and the front bars are prevented from turning relative to each other.

3. The portable bicycle of claim 1, further comprising a horizontal tube extended rearwardly from the lower seat tube for receiving the detached seat post.

4. The portable bicycle of claim 1, further comprising a T-shaped gap formed adjacent the front end of the rear bar, a H-shaped gap formed on the rear bar proximate a joining portion of the lower seat tube and the rear bar, and an upper flexible member and a lower flexible member formed adjacent the H-shaped gap, an upper lug and a lower lug extended outwardly from the upper and lower flexible members respectively, and wherein the fastening mechanism includes a first fastening means and a second fastening means being operative to secure the front bar to the rear bar at the T-shaped gap and the H-shaped gap respectively, the second fastening means including a bolt adapted to insert through the upper and lower lugs to couple to a nut, and an arcuate lever having a cam end pivotably coupled to the head of the bolt such that a counterclockwise turning of the lever causes the cam ends to exert force to pull the upper and lower lugs toward each other by flexibly deforming the upper and lower flexible members for securing the front bar to the rear bar.

5. The portable bicycle of claim 1, further comprising a fastening member formed at a top opening of the upper seat tube for securing the seat post to the upper seat tube.

6. The portable bicycle of claim 1, wherein the front frame section further comprises a hinge formed at a joining portion of the head tube and the stem so that the stem is adapted to fold downwardly from the hinge.

\* \* \* \* \*